United States Patent [19]

Hamer et al.

[11] 4,293,673
[45] Oct. 6, 1981

[54] SPHEROIDAL POLYMERIZATION CATALYST, PROCESS FOR PREPARING, AND USE FOR ETHYLENE POLYMERIZATION

[75] Inventors: Anthony D. Hamer; Frederick J. Karol, both of Belle Mead, N.J.

[73] Assignee: Union Carbide Corporation, New York, N.Y.

[21] Appl. No.: 95,010

[22] Filed: Nov. 28, 1979

Related U.S. Application Data

[63] Continuation-in-part of Ser. No. 974,013, Dec. 28, 1978, abandoned.

[51] Int. Cl.$^3$ .......................... C08F 2/34; C08F 4/02; C08F 10/02
[52] U.S. Cl. .................................. 526/88; 252/429 B; 526/97; 526/124; 526/125; 526/348.6; 526/352; 526/904
[58] Field of Search .............................. 526/125, 88

[56] References Cited

U.S. PATENT DOCUMENTS

| | | | |
|---|---|---|---|
| 3,953,414 | 4/1976 | Galli et al. | 526/125 |
| 4,089,808 | 5/1978 | Zucchini et al. | 526/125 |
| 4,098,979 | 7/1978 | Maemoto et al. | 526/141 |
| 4,101,722 | 7/1978 | Hogan et al. | 526/106 |
| 4,110,523 | 8/1978 | Schweier et al. | 526/125 |
| 4,124,532 | 11/1978 | Giannini et al. | 526/114 |

*Primary Examiner*—Edward J. Smith
*Attorney, Agent, or Firm*—John S. Piscitello

[57] ABSTRACT

A catalyst composition formed from selected organoaluminum compounds and a precursor composition of the formula $$Mg_mTi_1(OR)_nX_p[ED]_q[Filler]_r$$

wherein
ED is a selected electron donor compound
R is a $C_1$ to $C_{14}$, aliphatic or aromatic hydrocarbon radical, or $COR'$ wherein $R'$ is a $C_1$ to $C_{14}$ aliphatic or aromatic hydrocarbon radical, X is Cl, Br, I, or mixtures thereof, Filler is an inert organic or inorganic compound, and, based on the total weight of such composition
m is $\geq 0.5$ to $\leq 56$
n is 0 or 1
p is $\geq 6$ to $\leq 116$
q is $\geq 2$ to $\leq 5$
r has a value such that the percent filler is from about 10 to about 95 weight percent based on the total weight of the precursor composition. A process for preparing such precursor composition by spray drying it from a slurry or solution in said electron donor compound, using atomization. A process for using said catalyst to readily prepare ethylene polymers having a density of about $\geq 0.91$ to $\leq 0.97$, a melt flow ratio of $\geq 22$ to $\leq 32$ and a bulk density of about 18 to 32 lbs/ft$^3$ and controlled particle shape and size in a lower pressure gas phase process at a productivity of $\geq 50,000$ pounds of polymer per pound of Ti.

8 Claims, 1 Drawing Figure

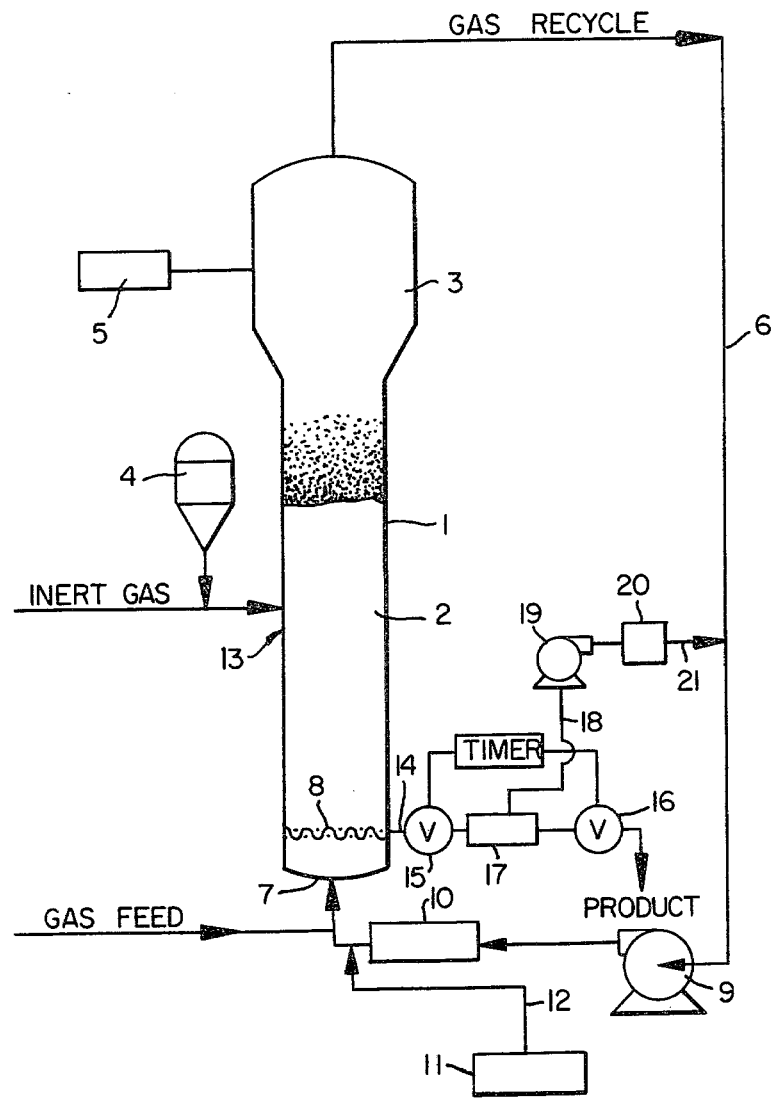

SPHEROIDAL POLYMERIZATION CATALYST, PROCESS FOR PREPARING, AND USE FOR ETHYLENE POLYMERIZATION

CROSS-REFERENCE TO RELATED PATENT APPLICATIONS

This patent application is a continuation-in-part of application Ser. No. 974,013 filed Dec. 28, 1978, now abandoned.

BACKGROUND OF THE INVENTION

The invention relates to the catalytic polymerization of ethylene with particularly produced high activity Mg and Ti containing complex catalysts in a low pressure gas phase process to produce polymers having a density of $\geq 0.91$ to $\leq 0.97$, a melt flow ratio of $\geq 22$ to $\leq 32$, a bulk density of 18 to 32 lbs/ft$^3$ and controlled particle shape and size.

DESCRIPTION OF THE PRIOR ART

To be commercially useful in a gas phase process, such as the fluid bed process of U.S. Pat. Nos. 3,709,853; 4,003,712 and 4,011,382, and Canadian Patent 991,798 and Belgian Pat. No. 839,380, the catalyst employed must be a high activity catalyst, that is, it must have a level of productivity of $\geq 50,000$, and preferably of $\geq 100,000$, pounds of polymer per pound of primary metal in the catalyst. This is so because such gas phase processes usually do not employ any catalyst residue removing procedures. Thus, the catalyst residue in the polymer must be so small that it can be left in the polymer without causing any undue problems in the hands of the resin fabricator and/or ultimate consumer. Where a high activity catalyst is successfully used in such fluid bed processes the heavy metal content of the resin is of the order of $\leq 20$ parts per million (ppm) of primary metal at a productivity level of $\geq 50,000$. Low catalyst residue contents are also important where the catalyst is made with chlorine containing materials such as the titanium, magnesium and/or aluminum chlorides used in some so-called Ziegler or Ziegler-Natta catalysts. High residual chlorine values in a molding resin will cause pitting and corrosion on the metal surfaces of the molding devices. Molding grade resins having Cl residues of the order of $\geq 200$ ppm are not commercially useful.

U.S. Pat. Nos. 3,922,322 and 4,035,560 disclose the use of several Ti and Mg containing catalysts for the manufacture of granular ethylene polymers in a gas phase fluid bed process under a pressure of <1000 psi. The use of these catalysts in these processes, however, have significant disadvantages. The catalysts of U.S. Pat. NO. 3,922,322 provide polymers having a very high catalyst residue content, i.e., about 100 ppm of Ti and greater than about 300 ppm Cl, according to the working example of this patent. Further, as disclosed in the working example of U.S. Pat. No. 3,922,322, the catalyst is used in the form of a prepolymer, and very high volumes of the catalyst composition must be fed to the reactor relative to the volume of polymer made in the reactor. The preparation and use of this catalyst thus requires the use of relatively large sized equipment for the manufacture, storage and transporting of the catalyst.

The catalysts of U.S. Pat. No. 4,035,560 also apparently provide polymers having high catalyst residues, and the catalyst compositions are apparently pyrophoric because of the types and amounts of reducing agents employed in such catalysts.

U.S. Pat. No. 3,953,414, issued Apr. 27, 1976, describes the polymerization of olefins with a catalyst prepared from a supported catalyst forming component and wherein the polymers are in the form of particles which have the shape of the supported component which is spherical or spheroidal. The catalysts are prepared by mixing (a) catalyst-forming components of organometallic compounds of metals belonging to Groups II or III of the Periodic Table with (b) supported components which are products consisting of a carrier comprising an anhydrous Mg halide and halogenated Ti compounds chemically combined with, or dispersed on, the carrier. The (b) components are in the form of spherical or spheroidal particles of a size between 1 and 350 microns. The (b) component of the catalyst is prepared in different ways, one of which consists of spraying solutions of an anhydrous Mg dihalide in an organic solvent. The spraying is conducted so as to yield spherically shaped particles which are between 1 and 300 microns in size. The removal of the solvent combined with the carrier is completed by heating the particles under reduced pressure. The particles of the carrier are then contacted with a halogenated Ti compound. The examples in the patent disclose the use of the catalysts in a slurry polymerization process.

U.S. Pat. No. 4,111,835, which issued Sept. 5, 1978, describes the polymerization of olefins to produce spheroidially shaped resin particles which are highly resistant to crumbling when the polymerization is carried out on a continuous scale. The catalyst is formed from (a) an organometallic compound of a metal of Group II of III of the Periodic Table and (b) a product obtained by reacting a halogenated titanium compound with a Mg hydrate halide in the form of spheroidal particles having particle sizes between 10 and 70 microns. The Mg hydrate halide contains from 10 to 45 percent by weight of water and is obtained by partial dehydration of a Mg hydrate halide prepared by direct synthesis from electrolytic Mg and hydrochloric acid followed by fractional crystallization of the synthesis product. The Mg hydrate halide is spray dried to obtain spherical particles. The Mg hydrate halide used as the support may be used in admixture with 20-80% by weight of cocarriers which are inert towards the Mg halide and which are compounds belonging to Groups I to IV of the Periodic Table. The examples in the patent describe the use of the catalysts in a slurry polymerization process.

Thus, U.S. Pat. Nos. 3,953,414 and 4,111,835 describe the preparation of ethylene polymers, exemplified by a slurry polymerization process, using particularly prepared catalyst components wherein a component of the catalyst (catalyst support) is spray dried to form spheroidal particles.

Further, the process of these patents is carried out using large concentrations of boiling TiCl$_4$ which is highly corrosive. Also, complex multi-step processes are involved. Moreover, the patents describe the use of hydrates which contain water. This water can be detrimental to the effectiveness of the catalyst.

U.S. Patent Application Ser. No. 892,325, filed Mar. 31, 1978, and refiled as Serial No. 014,414 on Feb. 27, 1979, now abandoned in the names of F. J. Karol et al., and entitled Preparation of Ethylene Copolymers in Fluid Bed Reactor, discloses that ethylene copolymers, having a density of 0.91 to 0.96, a melt flow ratio of ≧22 to ≦32 and a relatively low residual catalyst content can be produced in granular form, at relatively high productivities, if the monomer(s) are polymerized in a gas phase process with a specific high activity Mg-Ti containing complex catalyst which is blended with an inert carrier material. The granular polymers thus produced have excellent physical properties which allow them to be used in a broad range of molding applications.

U.S. Patent Application Ser. No. 892,037 filed on Mar. 31, 1978, now abandoned and refiled as Ser. No. 014,412 on Feb. 27, 1979, in the names of B. E. Wagner et al. and entitled Polymerization Catalyst, Process for Preparing, And Use For Ethylene Homopolymerization, discloses that ethylene homopolymers having a density range of 0.958 to 0.972 and a melt flow ratio of ≧22 to ≦32 and which have a relatively low residual catalyst residue can be produced at relatively high productivities for commercial purposes by a low pressure gas phase process if the ethylene is homopolymerized in the presence of a high activity magnesium-titanium complex catalyst blended with an inert carrier material.

The above noted U.S. patent applications Ser. Nos. 892,325; 892,037; 014,414 and 014,412 are hereinafter referred to as The Prior U.S. Applications.

However, the polymers produced with the blended catalysts of The Prior U.S. Applications have the disadvantage in that the polymer particles formed during the fluid bed polymerization process are irregular in shape and are somewhat difficult to fluidize. Also, the final product contains a relativey high level of fines, i.e., particles having a particle size of ≦125 microns.

Further, the method employed to form the catalyst precursor composition as described in the The Prior U.S. Applications involves forming the precursor by dissolving a titanium compound and magnesium compound in an electron donor compound. The precursor composition is then generally isolated by crystallization or by precipitation with a $C_5$ to $C_8$ aliphatic or aromatic hydrocarbon. However, these isolation techniques can lead to nonuniformpolymer particle growth and needle shaped polymer products.

U.S. patent application Ser. No. 892,322 filed on Mar. 31, 1978, and refiled as Ser. No. 012,720 on Feb. 16, 1979, in the names of G. L. Goeke et al. and entitled Impregnated Polymerization Catalyst, Process For Preparing, And Use For Ethylene Copolymerization, discloses that ethylene copolymers having a density of about 0.91 to 0.94 and a melt flow ratio of ≧22 to ≦32 and which have a relatively high bulk density and which provide films of good clarity can be produced at relatively high productivities for commercial purposes by a gas phase process if the ethylene is copolymerized with one or more $C_3$ to $C_8$ alpha olefins in the presence of a high activity magnesium-titanium complex catalyst prepared under specific activation conditions with an organoaluminum compound and impregnated in a porous inert carrier material.

However, the preparation of the impregnated catalyst precursor as taught in Ser. Nos. 892,322/012,720 can be difficult to control and the carrier material used for the impregnation can be of variable composition. If considerable care is not taken, variable catalyst performance can occur. Since polymer morphology appears to be dependent on the morphology of the carrier used for the catalyst, total flexibility and control of polymer particle characteristics is, at times, not possible.

SUMMARY OF THE INVENTION

It has now been unexpectedly found that ethylene polymers having a wide density range of about ≧0.91 to ≦0.97, a bulk density of about 18 to 32 lbs/ft$^3$, a melt flow ratio of ≧22 to ≦32, and which are of controlled particle shape and size, and which have a relatively low residual titanium content can be produced at relatively high productivities for commercial purposes by a gas phase process if the ethylene is homopolymerized, or copolymerized with one or more $C_3$ to $C_8$ alpha olefins, in the presence of a high activity magnesium-titanium complex catalyst prepared, as described below, by spray drying a magnesium-titanium containing precursor composition from a slurry or solution in an electron donor compound and activating such spray dried precursor composition under specific activation conditions with an organoaluminum compound.

A further object of this invention is to provide a process for producing ethylene polymers of a controlled particle size and shape by controlling the catalyst size and shape.

Another object of the present invention is to provide granular ethylene polymers which have a controlled particle size and shape and, as such, are more conducive to being fluidized in a fluid bed process, and wherein the final polymer product contains a relatively low level of very small particles, i.e., particles of about <74 microns.

Another object of the present invention is to provide a method of preparing a magnesium-titanium containing catalyst precursor composition of consistent particle shape and size.

Another object of this invention is to provide a simplified method of preparing a magnesium-titanium containing catalyst precursor composition.

Another object of this invention is to provide a spherical shaped free flowing catalyst precursor composition.

BRIEF DESCRIPTION OF THE DRAWING

The drawing shows a gas phase fluid bed reactor system in which the catalyst system of the present invention may be employed.

DESCRIPTION OF THE PREFERRED EMBODIMENT

It has now been found that the desired ethylene polymers having a low melt flow ratio, a wide range of density values and relatively high bulk density values and controlled particle shape and size can be readily produced with relatively high productivities in a low pressure gas phase reaction process if the monomer charge is polymerized or copolymerized in the presence of a specific high activity catalyst composition which is prepared from a spray dried precursor composition under a specific set of conditions, as is also detailed below. It has also been found that inclusion of inert fillers in the precursor composition improves polymer morphology.

The Ethylene Polymers

The ethylene polymers have a melt flow ratio of ≧22 to ≦32, and preferably of ≧25 to ≦30. The melt flow ratio value is another means of indicating the molecular weight distribution of a polymer. The melt flow ratio (MFR) range of ≧22 to ≦32 thus corresponds to a Mw/Mn value range of about 2.7 to 4.1 and the MFR range of $\geq 25$ to $\leq 30$ corresponds to a Mw/Mn range of about 2.8 to 3.6.

The homopolymers have a density of about $\geq 0.958$ to $\leq 0.972$. The copolymers have a density of about $\geq 0.91$ to $\leq 0.96$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.958$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a copolymer is a reflection of its molecular weight. Polymers having a relatively high molecular weight, have a relatively low melt index. Ultra-high molecular weight ethylene polymers have a high load (HLMI) melt index of about 0.0 and very high molecular weight ethylene polymers have a high load melt index (HLMI) of about 0.0 to about 1.0. Such high molecular weight polymers are difficult, if not impossible, to mold in conventional injection molding equipment. The polymers made in the process of the present invention, on the other hand, can be readily molded, in such equipment. They have a standard or normal load melt index of $\geq 0.0$ to about 100, and preferably of about 0.5 to 80, and a high load melt index (HLMI) of about 11 to about 2000. The melt index of the polymers which are made in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio. In addition to hydrogen, other chain transfer agents such as dialkyl zinc compounds may also be used to further increase the melt index of the copolymers.

The copolymers which may be prepared in the process of the present invention are copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atoms. The preferred $C_3$ to $C_8$ alpha olefins are propylene, butene-1, pentene-1, hexene-1, 4-methylpentene-1 and octene-1.

The ethylene polymers of the present invention have an unsaturated group content of $\leq 1$, and usually $\geq 0.1$ to $\leq 0.3$, C=C/1000 carbon atoms, and an n-hexane extractables content of less than about 3, and preferably less than about 2, weight percent.

The ethylene polymers of the present invention have a residual catalyst content, in terms of parts per million of titanium metal, of the order of $\leq 20$ parts per million, (ppm) at a productivity level of $\geq 50,000$, and of the order of $\leq 10$ parts per million at a productivity level of $\geq 100,000$, and of the order of $\leq 5$ parts per million at a productivity level of $\geq 200,000$.

The ethylene polymers of the present invention have a bulk density of about 18 to 32 lbs/ft$^3$. The ethylene polymers are spherical and have an average particle size of the order of about 250 to 2550 microns, and preferably of about 250 to 1525 microns, in diameter.

The homopolymers produced herein are useful for a variety of molded articles.

The copolymers of the present invention are useful for making film as well as being useful in other molding applications.

High Activity Catalyst

The compounds used to form the high activity catalyst used in the present invention comprise at least one titanium compound, at least one magnesium compound, at least one electron donor compound, at least one activator compound, as defined below.

The titanium compound has the structure $$Ti(OR)_a X_b$$

wherein

R is a $C_1$ to $C_{14}$ aliphatic or aromatic hydrocarbon radical, or COR' where R' is a $C_1$ to $C_{14}$ aliphatic or aromatic hydrocarbon radical, X is Cl, Br, I or mixtures thereof, a is 0, 1 or 2, b is 1 to 4 inclusive and $a+b=3$ or 4.

The titanium compounds can be used individually or in combinations thereof, and would include TiCl$_3$, TiCl$_4$, Ti(OCH$_3$)Cl$_3$, Ti(OC$_6$H$_5$)Cl$_3$, Ti(OCOCH$_3$)Cl$_3$ and Ti(OCOC$_6$H$_5$)Cl$_3$.

The magnesium compound has the structure:

$$MgX_2$$

wherein X is Cl, Br or I. Such magnesium compounds can be used individually or in combinations thereof and would include MgCl$_2$, MgBr$_2$ and MgI$_2$. Anhydrous MgCl$_2$ is the particularly preferred magnesium compound.

About 0.5 to 56, and preferably about 1 to 30, mols of the magnesium compound are used per mol of the titanium compound in preparing the catalysts employed in the present invention.

The titanium and magnesium compounds should be of a physical form and chemical nature such that they will have at least partial solubility in the electron donor compounds, as described below.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones; the most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 45, mols of the electron donor compound are used per mol of Ti.

The activator compound has the structure

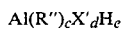

wherein X' is Cl or OR''', R'' and R''' are the same or different and are $C_1$ to $C_{14}$ saturated hydrocarbon radicals, d is 0 to 1.5, e is 1 or 0 and $c+d+e=3$.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_2H_5)_2H$ and $Al(C_2H_5)_2(OC_2H_5)$.

About 10 to 500, and preferably about 10 to 200, mols of the activator compound are used per mol of the titanium compound in activating the catalyst employed in the present invention.

Catalyst Preparation

The catalyst used in the present invention is prepared by first preparing a precursor composition from the titanium compound, the magnesium compound, the electron donor compound and filler and spray drying these compounds, as described below, into spherically shaped particles having an average particle size of from about 10 to about 200 microns. The spherically shaped particles are then treated with activator compound as described below.

An initial precursor composition is formed by dissolving the titanium compound and an excess of the magnesium compound ($1 \leq Mg/Ti \leq 56$) in the electron donor compound at a temperature of about 20° C. up to the boiling point of the electron donor compound. The titanium compound can be added to the electron donor compound before or after the addition of the magnesium compound, or concurrent therewith. The total or partial dissolution of the titanium compound and the magnesium compound can be facilitated by stirring, and, in some instances by refluxing, these two compounds in the electron donor compound.

In a separate vessel inert fillers such as magnesium chloride and/or silica, for example, are slurried in the electron donor compound at a temperature up to the boiling point of the electron donor compound. This slurry or solution can then be added, before or after cooling, to the solution of the Mg/Ti complex. The final slurry thus formed can be optionally heated to the boiling point of the electron donor prior to the spray drying.

The precursor slurry is spray-dried at an inlet nitrogen drying gas temperature which is in the range of greater than the electron donor boiling point up to about 150° C. A further variable controlled in the process is the solvent vapour pressure. The volume flow of drying gas is controlled so as to be considerably larger than the volumetric flow of the slurry/solution. The atomization of the slurry can be accomplished by an atomizing nozzle or a centrifugal high speed disc atomizer at atomizer pressures of between 1 and 200 psig.

The fillers which are added to the solution prior to spray drying include any organic or inorganic compounds which are inert to the titanium compound and the final active catalyst, such as silicon dioxide such as fumed silica, titanium dioxide, polystyrene, rubber modified polystyrene, magnesium chloride and calcium carbonate. These fillers may be used individually or in combinations thereof.

The amount of filler which can be present in the precursor composition is from about 10 to about 95 weight percent based on the total weight of the precursor composition. The insoluble fillers have an average particle size of the order of about $\leq 50$ microns.

When thus made as disclosed above, the precursor composition has the formula,

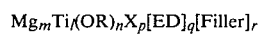

wherein ED is the electron donor compound, R is a $C_1$ to $C_{14}$ aliphatic or aromatic hydrocarbon radical, or COR' wherein R' is a $C_1$ to $C_{14}$ aliphatic or aromatic hydrocarbon radical, X is Cl, Br, I or mixtures thereof. Filler is the inert filler compound, and, based on the total weight of such composition, m is $\geq 0.5$ to $\leq 56$, and preferably $\geq 1.5$ to $\leq 5.0$, n is 0 or 1, p is $\geq 6$ to $\leq 116$, and preferably $\geq 6$ to $\leq 14$, q is $\geq 2$ to $\leq 85$, and preferably $\geq 4$ to $\leq 11$, r has a value such that the percent filler is from about 10 to about 95 weight percent.

Activation of Spray Dried Precursor Composition

In order to be used in the process of the present invention the spray dried precursor composition must be fully or completely activated, that is, it must be treated with sufficient activator compound to transform the Ti atoms in the precursor composition to an active state. The activation procedures which may be used in this regard are described below.

Procedure A (Total Activation in Reactor)

The spray dried precursor composition may be completely activated in the polymerization reactor. In this procedure, the activator compound and the spray dried precursor composition are preferably fed to the reactor through separate feed lines. The activator compound may be sprayed into the reactor in an undiluted form or in the form of a solution thereof in a hydrocarbon solvent such as isopentane, hexane, or mineral oil. This solution usually contains about 2 to 30 weight percent of the activator compound. The activator compound is added to the reactor in such amounts as to provide therein a total Al/Ti molar ratio of 10 to 500, and preferably of about 10 to 200. The activator compound added to the reactor reacts with, and activates, the titanium compound in the reactor.

Procedure B (Two-Stage Activation Process)

The activation of the spray dried precursor composition may be conducted in two stages.

In the first stage the precursor composition which has been spray dried is reacted with, and is partially activated by, enough activator compound so as to provide a partially activated precursor composition which has an activator compound/Ti molar ratio of about $>0$ to $\leq 10:1$, and preferably of about 4 to 8:1. The first of these two stages of activation may be conducted outside of the reactor. In order to render the partially activated precursor composition active for ethylene polymerization purposes, activator compound is added to the polymerization reactor to complete, in the reactor, the activation of the precursor composition. The additional activator compound and the partially activated precursor composition or the unactivated precursor composition are preferably fed to the reactor through separate feed lines. The activator compound may be sprayed into the reactor in an undiluted form or in the form of a solution thereof in a hydrocarbon solvent such as isopentane, hexane, or mineral oil. This solution usually contains about 2 to 30 weight percent of the activator compound. The activator compound is added to the reactor in such amounts as to provide, in the reactor, with the amounts of activator compound and titanium compound fed with the partially activated and spray dried precursor composition, a total Al/Ti molar ratio of 10 to 500, and preferably of about 10 to 200. The activator compound added to the reactor, reacts with, and activates or completes the activation of, the titanium compound in the reactor.

In a continuous gas phase process, such as the fluid bed process disclosed below, discrete portions of the spray dried precursor composition or partially activated precursor composition are continuously fed to the reactor with discrete portions of activator compound needed to activate or complete the activation of the partially activated precursor composition, during the continuing polymerization process in order to replace active catalyst sites that are expended during the course of the reaction.

The Polymerization Reaction

The polymerization reaction is conducted by contacting a stream of the monomer(s), in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction.

In order to achieve the desired density ranges in the copolymers it is necessary to copolymerize enough of the $\geq C_3$ comonomers with ethylene to achieve a level of $>0$ to 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that are copolymerized with ethylene in order to provide polymers having the desired density range at any given melt index. The listing also indicates the relative molar concentration, of such comonomers to ethylene, which are in the recycled gas stream of monomers under reaction equilibrium conditions in the reactor.

| Comonomer | mol % needed in copolymer | Gas Stream Comonomer/Ethylene molar ratio |
|---|---|---|
| propylene | >0 to 10 | >0 to 0.9 |
| butene-1 | >0 to 7.0 | >0 to 0.7 |
| pentene-1 | >0 to 6.0 | >0 to 0.45 |
| hexene-1 | >0 to 5.0 | >0 to 0.4 |
| octene-1 | >0 to 4.5 | >0 to 0.35 |

A fluidized bed reaction system which can be used in the practice of the process of the present invention is illustrated in the drawing. With reference thereto the reactor 1 consists of a reaction zone 2 and a velocity reduction zone 3.

The reaction zone 2 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The spray dried precursor composition or the partially activated precursor composition used in the fluidized bed is preferably stored for service in a reservoir 4 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 5 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 6 to the reactor at point 7 below the bed. There exists a gas distribution plate 8 above the point of return to aid fluidizing the bed.

The portion of the gas stream which does not react in the bed constitutes the recycle gas which is removed from the polymerization zone, preferably by passing it into a velocity reduction zone 3 above the bed where entrained particles are given an opportunity to drop back into the bed.

The recycle gas is then compressed in a compressor 9 and then passed through a heat exchanger 10 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 7 and to the fluidized bed through distribution plate 8. The compressor 9 can also be placed downstream of the heat exchanger 10.

The distribution plate 8 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate 8 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system downstream from heat exchanger 10. Thus, the activator compound may be fed into the gas recycle system from dispenser 11 thru line 12.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 100, and preferably about 20 to 30 moles of the Zn compound (as Zn) would be used in the gas stream in the reactor per mol of titanium compound (as Ti) in the reactor. The zinc compound would be introduced into the reactor, preferably in the form of a dilute solution (2 to 30 weight percent) in a hydrocarbon solvent or absorbed on a solid diluent material, such as silica, in amounts of about 10 to 50 weight percent. These compositions tend to be pyrophoric. The zinc compound may be added alone, or with any additional portions of the activator compound that are to be added to the reactor from a feeder, not shown, which could be positioned adjacent dispenser 11.

It is essential to operate the fluid bed reactor at a temperature below the sintering temperature of the polymer particles to insure that sintering will not occur. For the production of ethylene homopolymers and copolymers in the process of the present invention an operating temperature of about 30° to 115° C. is generally employed. Temperatures of about 75° to 95° C. are used to prepare products having a density of about 0.91 to 0.92, and temperatures of about 80° to 100° C. are used to prepare products having a density of about >0.92 to 0.94, and temperatures of about 90° to 115° C. are used to prepare products having a density of about >0.94 to 0.97.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The spray dried precursor or partially activated spray dried precursor composition is injected into the bed at a rate equal to its consumption at a point 13 which is above the distribution plate 8. Preferably, the catalyst is injected at a point in the bed where good mixing of polymer particles occurs. Injecting the catatlyst at a point above the distribution plate is an important feature of this invention. Since the catalysts used in the practice of the invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots". Injection of the catalyst into the reactor above the bed may result in excessive catalyst carryover into the recycle line where polymerization may begin and plugging of the line and heat exchanger may eventually occur.

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards or downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 14 at or close to the distribution plate 8 and in suspension with a portion of the gas stream which is bented as the particles settle to minimize further polymerization and sintering when the particles reach their ultimate collection zone. The suspending gas may also be used to drive the product of one reactor to another reactor.

The particulate polymer product is conveniently and preferably withdrawn through the sequential operation of a pair of timed valves 15 and 16 defining a segregation zone 17. While valve 16 is closed, valve 15 is opened to emit a plug of gas and product to the zone 17 between it and valve 15 which is then closed. Valve 16 is then opened to deliver the product to an external recovery zone. Valve 16 is then closed to await the next product recovery operation. The vented gas containing unreacted monomers may be recovered from zone 17 through line 18 and recompressed in compressor 19 and returned directly, or through a purifier 20, over line 21 to gas recycle line 6 at a point upstream of the recycle compressor 9.

Finally, the fluidized bed reactor is equipped with an adequate venting system to allow venting the bed during start up and shut down. The reactor does not require the use of stirring means and/or wall scraping means. The recycle gas line 6 and the elements therein (compressor 9, heat exchanger 10) should be smooth surfaced, and devoid of unnecessary obstructions so as not to impede the flow of recycle gas.

The highly active spray-dried catalyst system of this invention appears to yield a fluid bed product having an average particle size between about 250 to about 2550, and preferably about 250 to about 1525, microns.

The feed stream of gaseous monomer, with or without inert gaseous diluents, is fed into the reactor at a space time yield of about 2 to 10 pounds/hour/cubic foot of bed volume.

The term virgin resin or polymer as used herein means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

Density: For materials having a density of <0.940, ASTM-1505 procedure is used and plaque is conditioned for one hour at 100° C. to approach equilibrium crystallinity. For materials having a density of ≧0.940 a modified procedure is used wherein the test plaque is conditioned for one hour at 120° C. to approach equilibrium crystallinity and is then quickly cooled to room temperature. All density values are reported as grams/cm$^3$. All density measurements are made in a density gradient column.

Melt Index (MI): ASTM D-1238—Condition E—Measured at 190° C.—reported as grams per 10 minutes.

Flow Rate (HLMI): ASTM D-1238—Condition F—Measured at 10 times the weight used in the melt index test above.

$$\text{Melt Flow Ratio } (MFR) = \frac{\text{Flow Rate}}{\text{Melt Index}}$$

Productivity: a sample of the resin product is ashed and the weight percent of ash is determined; since the ash is essentially composed of the catalyst, the productivity is thus the pounds of polymer produced per pound of titanium metal consumed. The amount of Ti, Mg and halide in the ash are determined by elemental analysis. The values are reported in parts per million (ppm) of titanium metal.

Bulk density: The resin is poured via ⅜" diameter funnel into a 100 ml graduated cylinder to 100 ml line without shaking the cylinder, and weighed by difference. The values are reported in lbs/ft$^3$.

Average Particle Size: This is calculated from sieve analysis data measured according to ASTM-D-1921 Method A using a 500 g sample. Calculations are based on weight fractions retained on the screens.

Molecular Weight Distribution (Mw/Mn): Gel Permeation Chromatography For resins with density <0.94: Styrogel Packing: (Pore size Sequence is $10^7$, $10^5$, $10^4$, $10^3$, 60 A°) Solvent is Perchloroethylene at 117° C. For resins with density ≧0.94: Styrogel Packing: (Pore Size Sequence is $10^7$, $10^6$, $10^5$, $10^4$, 60 A°) Solvent is ortho dichloro Benzene at 135° C. Detection for all resins: Infra red at 3.45μ n-hexane extractables: FDA test used for polyethylene Film intended for food contact applications). A 200 square inch sample of 1.5 mil gauge film is cut into strips measuring 1"×6" and weighed to the nearest 0.1 mg. The strips are placed in a vessel and extracted with 300 ml of n-hexane at 50°±1° C. for 2 hours. The extract is then decanted into tared culture dishes. After drying the extract in a vacuum desiccator the culture dish is weighed to the nearest 0.1 mg. The extractables, normalized with respect to the original sample weight, is then reported as the weight fraction of n-hexane extractables.

Unsaturation: Infrared Spectrophotometer (Perkin Elmer Model 21). Pressings made from the resin which are 25 mils in thickness are used as test specimens. Absorbance is measured at 10.35μ for transvinylidene unsaturation, 11.0μ for terminal vinyl unsaturation, and 11.25μ for pendant vinylidene unsaturation. The absorbance per mil of thickness of the pressing is directly proportional to the product of unsaturation concentration and absorbtivity. Absorbtivities are taken from the literature values of R. J. de Kock, et al, J. Polymer Science, Part B, 2, 339, (1964).

I. Preparation of Spray Dried Precursor

In a 5 liter flask equipped with a mechanical stirrer was placed 1.0 liter of tetrahydrofuran (THF). 71.0 g of anhydrous magnesium chloride was slowly added to the THF while stirring under a nitrogen atmosphere. The temperature of this exothermic reaction was controlled by the rate of addition of the magnesium chloride and by using a water bath. When the addition of the magnesium chloride was complete, 90.0 g of fumed silica was slowly added to the slurry. Upon the completion of the addition of the fumed silica the slurry was refluxed for a period of 2 to 6 hours. (The fumed silica had a particle size in the range of 0.007 to 0.05 microns and is sold commercially as CAB-O-SIL fumed silica by Cabot Corporation. It has an $SiO_2$ content of >99.8%).

In a separate 2 liter flask equipped with a mechanical stirrer 13.4 g of anhydrous $MgCl_2$ was mixed with 0.8 liter of THF under nitrogen. The mixture was stirred at room temperature (~25° C.) while 8.9 ml of $TiCl_4$ was added dropwise over a ½ hour period. After complete addition of the $TiCl_4$, the contents of the flask were heated to reflux for about ½ to 1 hour to dissolve the solids. The system was cooled to room temperature under agitation. The contents of this flask were then slowly added to the contents of the slurry of magnesium chloride previously prepared. The contents of the vessel were refluxed with stirring for about 1 hour and then cooled to room temperature with stirring. The final product was a yellowish-green colored slurry which remained in suspension for about 1 hour before separating.

The slurry/suspension was spray dried in an inert atmosphere with a spray-drier having two nozzles having a diameter of 0.06 inches and an annular ring diameter of 0.10 inches under an atomization pressure of 10 psi and at a drying nitrogen inlet gas temperature of 112° C. The spherically shaped catalyst particles collected in a cyclone had an average particle diameter of about 25 microns as measured from optical micrographs.

II. Activation Procedure

The precursor compositions as formed in I above were activated by different procedures.

Procedure A (Total Activation in Reactor)

The activator compound is fed to the polymerization reactor for the purpose of activating the precursor composition. It is fed into the reactor as a dilute solution in a hydrocarbon solvent such as isopentane. These dilute solutions contain about 2 to 30% by weight of the activator compound.

The activator compound is added to the polymerization reactor so as to maintain the Al/Ti ratio in the reactor at a level of about 10 to 500 and preferably of 10 to 200.

Procedure B (Two-Stage Activation Process)

The precursor composition as formed in I above was activated by adding said precursor composition and activator compound to a mixing tank with sufficient amounts of anhydrous aliphatic hydrocarbon diluent such as isopentane to provide a slurry system.

The activator compound and precursor compound are used in such amounts as to provide a partially activated precursor composition which has an Al/Ti ratio of >0 to 23 10:1 and preferably of 4 to 8:1.

The contents of the slurry system are then thoroughly mixed at room temperature and at atmospheric pressure for about ¼ to ½ hour. The resulting slurry is then dried under a purge of dry inert gas such as nitrogen or argon, at atmospheric pressure and at a temperature of 65°±10° C. to remove the hydrocarbon diluent. The resulting composition is in the form of a partially activated spray-dried precursor.

When additional activator compound is fed to the polymerization reactor for the purpose of completing the activation of a partially activated precursor composition, or to activate completely, in one step, an inactivated precursor composition, it is fed into the reactor as a dilute solution in a hydrocarbon solvent such as isopentane. These dilute solutions contain about 2 to 30% by weight of the activator compound.

The activator compound is added to the polymerization reactor so as to maintain the Al/Ti ratio in the reactor at a level of about 10 to 500 and preferably of 10 to 200.

EXAMPLES 1 to 9

Ethylene was homopolymerized (in Examples 2, 8 and 9) and copolymerized with butene-1 (in Examples 1 and 3 and 7) in this series of Examples with catalyst formed as described above and activated according to both Procedure A (Examples 1 to 3 and 5 to 7) and Procedure B (Examples 4, 8 and 9) to produce polymers having a density of >0.920 to ≦0.970.

Each of the polymerization reactions was continuously conducted for >1 hour after equilibrium was reached and under a temperature as indicated in Table I, a pressure of 300 psia and a gas velocity of about 3 to 6 times $G_{mf}$ in a fluid bed reactor system at a space time yield of about 3 to 7 lbs/hr/ft³ of bed space. The reactor system was as described in the drawing, above. It had a lower section 10 feet high and 13-½ inches in (inner) diameter, and an upper section which was 16 feet high and 23 ½ inches in (inner) diameter.

Table I below lists, with respect to Examples 1 to 9, various operating conditions employed in such examples, i.e., the weight % of $[MgCl_2]_{2.5}[TiCl_4][THF]_7$; the type and amount of filler; Al/Ti ratio in the partially activated precursor composition; polymerization temperature; $H_2/C_2$ mol ratio; comonomer $C_4/C_2$ mol ratio in reactor and catalyst productivity in terms of pounds of polymer produced/pounds of titanium metal, reported in ppm of titanium metal. Table II below lists properties of the granular virgin resins made in Examples 1 to 9, i.e., density; melt index (MI); melt flow ratio (MFR); bulk density, average particle size, and content (percent by weight) of very small particles (<74 microns).

TABLE I

Reaction Conditions for Examples 1 to 9

| Example | $[MgCl_2]_{2.5}[TiCl_4][THF]_{1.0}$ (wt percent) | Filler Type | Filler Amount (wt. %) | Al/Ti ratio in part. act. precursor | Temp, °C. | $H_2/C_2$ mol ratio | $C_4/C_2$ mol ratio | Catalyst Productivity (ppm Ti) |
|---|---|---|---|---|---|---|---|---|
| 1 | 16 | fumed silica | 53 | 0 | 85 | 0.200 | 0.311 | 7.1 |
|   |    | MgCl₂ | 31 |   |    |       |       |     |
| 2 | 27 | fumed silica | 41 | 0 | 95 | 0.508 | — | 10.9 |
|   |    | MgCl₂ | 32 |   |    |       |   |      |
| 3 | 27 | fumed silica | 41 | 0 | 85 | 0.211 | 0.301 | 5.5 |
|   |    | MgCl₂ | 32 |   |    |       |       |     |
| 4 | 27 | fumed silica | 41 | 10 | 85 | 0.198 | 0.302 | 5.1 |
|   |    | MgCl₂ | 32 |    |    |       |       |     |
| 5 | 35 | Al₂O₃ | 40 | 0 | 85 | 0.209 | 0.310 | 3.3 |
|   |    | Polystyrene | 25 |   |    |       |       |     |
| 6 | 42 | fumed silica | 40 | 0 | 85 | 0.207 | 0.300 | 6.1 |
|   |    | Polystyrene | 18 |   |    |       |       |     |
| 7 | 100 | — | — | 0 | 85 | 0.210 | 0.430 | 25.0 |
| 8 | 90 | fumed silica | 10 | 6 | 95 | 0.513 | — | 18 |
| 9 | 90 | fumed silica | 10 | 6 | 95 | 0.206 | — | 9 |

TABLE II

Properties of Polymers made in Examples 1 to 9

| Example | Density | M.I. | MFR | Bulk Density, lbs/ft$^3$ | Aver. Part. Size of Spherical Polymer Particles, microns | Very small particles <74 microns, percent |
|---|---|---|---|---|---|---|
| 1 | 0.926 | 2.3 | 28 | 21.9 | 630 | 0.6 |
| 2 | 0.970 | 4.8 | 28 | 28.1 | 418 | 4.7 |
| 3 | 0.924 | 2.5 | 27 | 18.0 | 757 | 0.4 |
| 4 | 0.922 | 2.3 | 26 | 21.8 | 1008 | 0.6 |
| 5 | 0.927 | 3.5 | 26 | 18.1 | 848 | 0.0 |
| 6 | 0.930 | 2.7 | 26 | 21.2 | 554 | 0.4 |
| 7 | 0.927 | 1.0 | 24 | 15.0 | 737 | — |
| 8 | 0.969 | 6.4 | 28 | 28.1 | 787 | <2.0 |
| 9 | 0.959 | 1.1 | 28 | 25.6 | 863 | <2.0 |

The data of Table II show that when a precursor composition is spray dried without containing filler (Example 7) the bulk density is low. Also the polymer particles formed in Example 7 were a fibrous mass with a cotton-like consistency.

What is claimed is:

1. A catalytic process for producing ethylene polymers selected from the group consisting of ethylene homopolymers and copolymers with a Ti containing catalyst at a productivity of ≥50,000 pounds of polymer per pound of Ti under a pressure of <1000 psi in the gas phase said polymer being produced in granular spherical form having a particle size of from about 250 to about 2550 microns and having a density of ≥0.91 to ≤0.97 and melt flow ratio of ≥22 to ≤32 which comprises homopolymerizing or copolymerizing ethylene at a temperature of about 30° to 115° C. by contacting the monomer charge with spherical particles of an activated catalyst composition produced by (A) forming a spherical precursor composition of the formula:

$Mg_mTi_1(OR)_nX_p[ED]_q[Filler]_r$ wherein

R is a $C_1$ to $C_{14}$ aliphatic or aromatic hydrocarbon radical, or COR' wherein R' is a $C_1$ to $C_{14}$ aliphatic or aromatic hydrocarbon radical, X is Cl, Br, I, or mixtures thereof, ED is an electron donor compound, Filler is an inert filler compound, and, based on the total weight of said composition, m is ≧0.5 to ≦56, n is 0 or 1, p is ≧2 to ≦116, q is ≧2 to ≦85, and r has a value such that the percent filler is from about 10 to about 95 weight percent based on the total weight of said composition, by forming a slurry or solution of at least one magnesium compound and at least one titanium compound and at least one filler compound in at least one electron donor compound so as to thereby form a slurry or solution of said precursor composition in said electron donor compound and spray drying said slurry or solution by atomization to form spherical particles of said precursor composition which have a particle size of from about 10 to about 200 microns, said magnesium compound having the structure $MgX_2$, said titanium compound having the structure $Ti(OR)_aX_b$ wherein a is 0, 1 or 2, b is 1 to 4 inclusive and a+b=3 or 4, said electron donor compound being a liquid organic compound in which said magnesium compound and said titanium compound are soluble and which is selected from the group consisting of alkyl esters of aliphtic and aromatic carboxylic acids, aliphatic ethers, cyclic ethers and aliphatic ketones and, (B) completely activating said precursor composition with 10 to 500 mols of activator compound per mol of Ti in said precursor composition, said activator compound having the formula $Al(R'')_cX'_dH_e$ wherein X' is Cl or OR''', R'' and R''' are the same or different, and are $C_1$ to $C_{14}$ saturated hydrocarbon radicals, d is 0 to 1.5, e is 1 or 0 and c+d+e=3, said activating being conducted after the recovery of said particles of said precursor composition.

2. A process as in claim 1 which is conducted in a fluid bed process.

3. A process as in claim 2 which is conducted under a mass gas flow rate of about 1.5 to 10 times $G_{mf}$.

4. A process as in claim 3 which is conducted at a productivity of ≧100,000.

5. A process as in claim 3 which is conducted at a productivity of ≧200,000.

6. A process as in claim 1 in which ethylene is copolymerized with at least one $C_3$ to $C_8$ alpha olefin.

7. A process as in claim 6 in which ethylene is copolymerized with butene-1.

8. A process as in claim 6 in which ethylene is copolymerized with propylene.

* * * * *